United States Patent [19]

Hinnenkamp et al.

[11] Patent Number: 4,462,971
[45] Date of Patent: Jul. 31, 1984

[54] PREPARATION OF CRYSTALLINE METAL SILICATE AND BOROSILICATE COMPOSITIONS

[75] Inventors: James A. Hinnenkamp; Vernon V. Walatka, Jr., both of Cincinnati, Ohio

[73] Assignee: National Distillers and Chemical Corporation, New York, N.Y.

[21] Appl. No.: 454,132

[22] Filed: Dec. 29, 1982

Related U.S. Application Data

[63] Continuation of Ser. No. 256,304, Apr. 22, 1981, abandoned, which is a continuation-in-part of Ser. No. 92,127, Nov. 7, 1979, Pat. No. 4,331,641.

[30] Foreign Application Priority Data

Oct. 23, 1980 [CA] Canada .................... 363052

[51] Int. Cl.³ .............. C01B 33/20; C01B 33/26; C01B 35/10
[52] U.S. Cl. .................. 423/277; 423/326; 423/328; 423/329; 423/332; 423/333; 502/60; 502/77; 502/202
[58] Field of Search ......... 423/277, 326–333; 252/431 N, 432, 454, 455 Z, 456, 458, 459, 460; 260/429 R, 429.3, 429.5, 429.7, 438.5, 439 R, 447; 556/402; 501/60, 77, 202

[56] References Cited

U.S. PATENT DOCUMENTS

| | | | |
|---|---|---|---|
| 3,941,871 | 3/1976 | Dwyer et al. | 423/326 |
| 4,049,573 | 9/1977 | Kaeding | 252/432 |
| 4,208,305 | 6/1980 | Kouwenhoven et al. | 423/326 |
| 4,269,813 | 5/1981 | Klotz | 423/277 |
| 4,299,808 | 11/1981 | Klotz | 423/331 |
| 4,376,757 | 3/1983 | Hinnenkamp et al. | 423/332 |

FOREIGN PATENT DOCUMENTS

| | | | |
|---|---|---|---|
| 2831611 | 2/1980 | Fed. Rep. of Germany | 423/326 |
| 2024790 | 1/1980 | United Kingdom | 423/326 |

Primary Examiner—Edward J. Meros
Attorney, Agent, or Firm—Kenneth D. Tremain

[57] ABSTRACT

Crystalline metal silicates and metal borosilicate compositions exhibit useful catalytic properties when the reaction mixture from which they are prepared includes a metal whose oxide precipitates at a pH above 7 and an amount of urea or other compound which upon hydrolysis releases ammonia. The precipitated metal hydroxide is incorporated into the crystalline composition as it forms. These compositions exhibit the X-ray pattern of a ZSM-5 zeolite and have an aluminum content of less than 100 wppm and a composition expressed in terms of its oxides as follows:

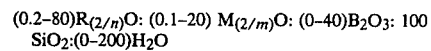

$(0.2-80)R_{(2/n)}O : (0.1-20) M_{(2/m)}O : (0-40)B_2O_3 : 100\ SiO_2 : (0-200)H_2O$ where R is tetramethyl ammonium cation, ammonium cation, hydrogen cation, an alkali metal cation, metal cation or mixtures thereof, n is the valence of R, M is a metal whose hydroxide precipitates at a pH above 7 and m is the valence of said metal. These crystalline silicates and borosilicates are usefully employed as catalysts in hydrocarbon conversions.

10 Claims, No Drawings

PREPARATION OF CRYSTALLINE METAL SILICATE AND BOROSILICATE COMPOSITIONS

CROSS-REFERENCE TO RELATED APPLICATIONS

This application is a continuation of application Ser. No. 256,304, filed Apr. 22, 1981, now abandoned, which application is a continuation-in-part of Ser. No. 092,127, filed Nov. 7, 1979, now U.S. Pat. No. 4,331,641.

BACKGROUND OF THE INVENTION

1. Field of the Invention

The present invention relates to new crystalline metal silicate and metal borosilicate compositions. This invention particularly relates to a method of preparing these compositions and to certain catalytic conversion processes employing these compositions.

2. Description of the Prior Art

Zeolitic materials, both natural and synthetic, are known to have catalytic capability for various types of reactions, especially hydrocarbon conversions. The well-known crystalline aluminosilicate zeolites are commonly referred to as "molecular sieves" and are characterized by their highly ordered crystalline structure and uniformly dimensioned pores, and are distinguishable from each other on the basis of composition, crystal structure, adsorption properties and the like. The term "molecular sieves" is derived from the ability of the zeolite materials to selectively adsorb molecules on the basis of their size and form.

The processes for producing such crystalline synthetic zeolites are well known in the art. A family of crystalline aluminosilicate zeolites, designated ZSM-5, is disclosed in U.S. Pat. No. 3,702,886, said patent being incorporated herein by reference. The family of ZSM-5 compositions has a characteristic X-ray diffraction pattern and, can also be identified, in terms of mole ratios of oxides, as follows:

$$0.9 \pm 0.2 M_{2/n}O : W_2O_3 : 5-100 YO_2 : zH_2O$$

wherein M is a cation, n is the valence of said cation, W is selected from the group consisting of aluminum and gallium, Y is selected from the group consisting of silicon and germanium, and z is from 0 to 40. In a preferred synthesized form, the zeolite has a formula, in terms of mole ratios of oxides, as follows:

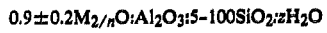

$$0.9 \pm 0.2 M_{2/n}O : Al_2O_3 : 5-100 SiO_2 : zH_2O$$

and M is selected from the group consisting of a mixture of alkali metal cations, especially sodium, and tetraalkylammonium cations, the alkyl groups of which preferably contain 2-5 carbon atoms.

U.S. Pat. No. 3,941,871 relates to novel crystalline metal organosilicates which are essentially free of Group IIIA metals, i.e., aluminum and/or gallium. This patent is incorporated herein by reference. It is noted therein that the amount of alumina present in the known zeolites appears directly related to the acidity characteristics of the resultant product and that a low alumina content has been recognized as being advantageous in attaining a low degree of acidity which in many catalytic reactions is translated into low coke making properties and low aging rates. A typical procedure for making the organosilicates is to react a mixture containing a tetraalkylammonium compound, sodium hydroxide, an oxide of a metal other than a metal of Group IIIA, an oxide of silicon, and water until crystals of said metal organosilicates are formed. It is also noted in the patent that the family of crystalline metal organosilicates have a definite X-ray diffraction pattern which is similar to that for the ZSM-5 zeolites. Minor amounts of alumina are contemplated in the patent and are attributable primarily to the presence of aluminum impurities in the reactants and/or equipment employed.

U.S. Pat. No. 3,844,835 discloses crystalline silica compositions. The crystalline silica materials may also contain a metal promoter which may be selected from Group IIIA, Group VB or Group VIB elements.

U.S. Pat. No. 4,088,605 is directed to the synthesis of a zeolite, such as ZSM-5, which contains an outer shell free from aluminum. The patent states at column 10, line 20 at seq., that to produce the outer aluminum-free shell it is also essential that the reactive aluminum be removed from the reaction mixture. It is therefore necessary, as noted therein, to process the zeolite and to replace the crystallization medium with an aluminum-free mixture to obtain crystalization of $SiO_2$ on the surface of the zeolite which can be accomplished by a total replacement of the reaction mixture or by complexing from the original reaction mixture any remaining aluminum ion with reagents such as gluconic acid or ethylenediaminetetraacetic acid (EDTA).

Crystalline borosilicate compositions are disclosed in German Offenlegungschrift No. 27 46 790. This application relates specifically to borosilicates which are prepared using the usual procedures for making the aluminosilicate zeolites. It is noted therein that in instances where a deliberate effort is made to eliminate aluminum from the borosilicate crystal structure because of its adverse influence on particular conversion processes, the molar ratios of $SiO_2/Al_2O_3$ can easily exceed 2000-3000 and that this ratio is generally only limited by the availability of aluminum-free raw materials.

German Offlenegungschrift No. 28 48 849 relates to crystalline aluminosilicates of the ZSM-5 zeolite series. These particular zeolites have a silica to alumina mole ratio greater than 20 and are prepared from a reaction mixture containing a source of silica, alumina, a quaternary alkyl ammonium compound and a metal compound including such Group VIII metals as ruthenium, palladium and platinum.

U.S. Pat. No. 4,113,658 relates to the precipitation of metal compounds on support materials and discloses the decomposition of urea to form ammonia which in turn causes the formation of precipitates of metal hydroxides which deposit on solid support materials. No suggestion is made of applying this technique to the preparation of crystalline zeolites.

While the art has provided zeolitic catalysts having a wide variety of catalytic and adsorptive properties, the need still exists for crystalline materials having different and/or enhanced catalytic properties. For example, an important use for a crystalline material is in conversion processes of oxygenated compounds such as the conversion of dimethyl ether and methanol to aliphatic compounds as well as the conversion of synthesis gas or hydrocarbons, such as ethylene, at a significant level of conversion and selectivity.

It is an object of this invention to provide novel crystalline metal silicate and metal borosilicate compositions.

It is another object of this invention to provide novel crystalline metal silicate and metal borosilicate compositions having different and enhanced catalytic properties.

It is a further object of this invention to provide a method of preparing novel crystalline metal silicate and metal borosilicate compositions from mixtures of appropriate oxides.

It is a still further object of this invention to provide an improved method for the conversion of hydrocarbons, synthesis gas or oxygenated organic compounds to useful end products at significant conversion rates and product selectivity.

SUMMARY OF THE INVENTION

These and other objects are achieved herein by providing crystalline metal silicate compositions prepared by a method which comprises:

(a) preparing a first mixture comprising a tetraalkyl ammonium salt, alkali metal hydroxide, silica and water, (b) preparing a second mixture comprising water, a soluble source of a metal whose hydroxide precipitates at a pH above 7 and an amount of urea or a compound which upon hydrolysis releases ammonia, said amount effective to precipitate the hydroxide of said metal, (c) admixing an amount of said first mixture and an amount of said second mixture effective to provide a reaction mixture having an aluminum content of less than about 100 wppm and having a composition in terms of mole ratios of oxides, falling within the following range:

| | |
|---|---|
| $OH^-/SiO_2$ | 0.05–3 |
| $Q^+/(Q^+ + A^+)$ | 0.01–1 |
| $H_2O/OH^-$ | 10–800 |
| $SiO_2/M_{2/m}O$ | 10–10,000 | wherein $Q^+$ is tetralkyl ammonium ion, $A^+$ is alkali metal ion, M is said metal and m is the valence of said metal, whereby the hydroxide of said metal for a precipitate, (d) maintaining the reaction mixture at a temperature of about 50° to about 250° C. until crystals of metal silicate are formed and (e) separating and recovering said crystals.

Corresponding borosilicates are prepared by incorporating a soluble boron compound in the reaction mixture.

The crystalline metal silicates and metal borosilicates prepared by the above method have an X-ray diffraction pattern substantially that of a ZSM-5 zeolite and have a composition in terms of mole ratios of oxides as set forth as follows in Formula A:

$(0.2-80)R_{(2/n)}O$: $(0.1-20)M_{(2/m)}O$: $(0-40)$ $B_2O_3$: 100 $SiO_2$: $(0-200)H_2O$ wherein R is tetraalkyl ammonium cation, ammonium cation, hydrogen cation, alkali metal cation, metal cation or mixtures thereof, n is the valence of R, M is a metal whose hydroxide precipitates at a pH above 7 and m is the valence of said me, said composition having an aluminum content of less than about 100 wppm.

The catalyst properties of these metal silicates are evidenced in a conversion process which comprises: contacting an oxygenated compound, such as methanol, dimethyl ether and mixtures thereof with the crystalline metal silicate prepared by the above described method.

These metal silicates are also useful in a process for the polymerization of ethylene which comprises contacting ethylene, under conversion conditions, with the crystalline silicate prepared by the above described method.

Another conversion process utilizing the metal silicates of this invention involves a method for the conversion of synthesis gas, comprising hydrogen and carbon monoxide, to hydrocarbons and/or oxygenated compounds, said method comprising contacting said synthesis gas, under conversion conditions, with the crystalline silicate composition prepared by the above described method.

DESCRIPTION OF THE PREFERRED EMBODIMENTS

A new class of crystalline metal silicate and metal borosilicate compositions has now been discovered. These crystalline compositions are prepared by a process which requires that the amount of aluminum in the reaction mixture be carefully controlled and further that the reaction mixture contain (a) a metal whose hydroxide precipitates at a pH above 7 and (b) urea or a compound which upon hydrolysis releases ammonia and that the release of ammonia causes the hydroxide of the metal to form in the reaction mixture. The formation of the metal hydroxide precipitate is described herein as "urea precipitation." In an optional embodiment, a source of boron is included in the reaction mixture so that the crystalline compositions may additionally contain $B_2O_3$.

The silicates of this invention are prepared by heating a reaction mixture comprising tetraalkyl ammonium ion, e.g. tetrapropyl ammonium bromide or hydroxide, alkali metal, i.e. sodium hydroxide, a solubles salt of a metal whose hydroxide is insoluble at a pH above 7, an oxide of silicon, water, and an amount of urea or a compound which upon hydrolysis releases ammonia, said amount being effective to precipitate the hydroxide of the metal, usually having the composition in terms of mole ratios falling within the following ranges:

| | Broad | Preferred |
|---|---|---|
| $OH^-/SiO_2$ | 0.05–3 | 0.20–0.90 |
| $Q^+/(Q^+ + A^+)$ | 0.01–1 | 0.03–0.9 |
| $H_2O/OH^-$ | 10–800 | 20–500 |
| 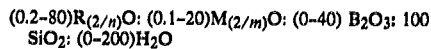 | 10–10,000 | 30–4000 | where $Q^+$ is tetraalkyl ammonium ion, $A^+$ is alkali metal ion, M is said metal and m is the valence of said metal and maintaining the mixture at elevated temperature for a time sufficient to form crystals of the product. Typical reaction conditions consist of heating the reaction mixture at elevated temperature, e.g. 50° to about 250° C., and even higher, for a period of time of from about 6 hours to as much as 60 days. The preferred temperature is from about 100° to 190° C. for time periods of from about 1 to about 16 days. The reaction mixture can be heated at elevated pressure as in an autoclave, or at normal pressure, e.g. as by refluxing. The preferred method of heating the reaction mixture is at reflux temperature.

As is common practice in the production of silicate compositions, when reflux heating of the reaction mixture is employed large amounts of sodium chloride along with some sulfuric acid, are added to the reaction mixture to ensure crystallization of the product. Thus, in reflux preparation, the ratios of $OH^-/SiO_2$ and like ratios tend to result in values different from the ratios of the autoclave processing.

Of course, in the preparation of the reaction mixture for the heating step, the reaction mixture is maintained substantially free of aluminum, i.e. contains less than 100 wppm.

Optionally, a soluble source of boron may be added to the reaction mixture to permit the preparation of the borosilicates species of the metal silicates of this invention. Where such addition is made the reaction mixture composition, in terms of mole ratios, will include the following mole ratio falling within the following ranges, in addition to those listed above:

|  | Broad | Preferred |
| --- | --- | --- |
| $SiO_2/B_2O_3$ | 2–1000 | 12–500 |

The digestion of the gel particles is carried out until crystals form. The solid product is separated from the reaction medium, as by cooling the whole to room temperature, filtering, and water washing.

The foregoing product is dried, e.g., at 110° C. for from about 8 to 25 hours or longer. Of course, milder conditions may be employed if desired, e.g., room temperature under vacuum.

The crystalline silicate compositions prepared in accordance with the above procedure are substantially free of aluminum, i.e., containing less than about 100 wppm (weight parts per million) and can be identified in terms of the mole ratios of oxides as set forth in Formula A above. In an optional embodiment, the composition contains $B_2O_3$. In preferred embodiments the metal whose hydroxide forms the precipitate is iron, cobalt, bismuth, chromium, molybdenum, nickel, tin, platinum or mixtures thereof.

Members of this family of crystalline metal silicate and metal borosilicate compositions possess a definite crystalline structure which has the x-ray diffraction pattern of a ZSM-5 zeolite.

Although the X-ray diffraction pattern does not distinguish these silicates from a ZSM-5 type zeolite there are significant points of distinction. The compositions are distinct in that the present compositions, in contradiction to the ZSM-5 zeolites, are not aluminosilicates and in fact, contain less than 100 ppm of aluminum. The catalytic properties of ZSM-5 type zeolites and the compositions of this invention also distinguish them. In converting dimethylether, both materials exhibit extremely high yields (above 80%) wile the compositions herein produce significantly more aliphatic hydrocarbons and less aromatics than does a ZSM-5 type zeolite.

An important feature of the invention is a process for activating the novel crystalline composition of the invention for enhanced use in various conversion processes. In general, the activation procedure comprises:

(a) Heat treating the dried silicate composition at e.g., about 200° to about 900° C., preferably about 400° to about 600° C. for about 1 to about 60 hours, preferably about 10 to about 20 hours in a molecular oxygen containing atmosphere.

In a preferred embodiment, the activation procedure comprises:

(1) Heat treating the dried silicate composition at e.g., about 200° to about 900° C., preferably about 400° to about 600° C. for about 1 to about 60 hours, preferably about 10 to about 20 hours;

(2) Ion exchanging the heat treated silicate composition with a material which upon further heat treating decomposes to provide a composition having a hydrogen cation;

(3) Washing and drying the exchanged silicate composition;

(4) Heat treating the dried silicate using the procedure of step (1);

It will be appreciated by those skilled in the art that steps (1)–(4), inclusive of the preferred embodiment, and step (a), above, are well-known and represent methods commonly used to activate zeolite type catalysts. The composition of the invention may be suitably employed in the form obtained after step (4) or after step (a). Heat treating may be done in any atmosphere as is known in the art and is preferably done in air.

Where desired, the tivation procedure may, optionally, include the Redox Treatment disclosed in commonly assigned patent application Ser. No. 092,127, filed Nov. 7, 1979, now U.S. Pat. No. 4,331,641 said application being incorporated herein by reference. This treatment includes a heat treatment conducted with a reducing agent and is practiced, following step (a) or step (4) of the above activation procedures, as follows:

(b) or (5) Treating the heated silicate composition with a reducing agent for about 1 to about 80 hours, preferably about 2 to about 40 hours, at about 200° to about 900° C., preferably about 400° to about 600° C., and (c) or (6) Heat treating the reduced silicate using the procedure of step (a) or (1), respectively.

Any reducing agent may be used or a compound which under the treatment conditions forms a reducing agent, such as dimethylether. Dimethylether and hydrogen are preferred because of their demonstrated effectiveness.

The activation procedure disclosed herein which does not include the "Redox Treatment" provides a catalytically active composition which exhibits useful levels of conversion and selectivity in the reactions catalyzed by the compositions of this invention and is the preferred activation procedure. Although the inclusion of the "Redox Treatment" is not necessary to provide a useful catalyst, subjecting the compositions of this invention to Redox Treatment following oxidative activation may provide some alteration in the selectivity, usually minor in nature. Therefore, where economically, justified or where slight alteration in selectivity is required, Redox Treatment may be utilized.

As noted hereinabove, and as known in the art, the procedure for preparing zeolites, e.g., aluminosilicates is well-known. It is an essential feature of the present invention however, that the crystalline silicate composition be prepared using a reaction mixture containing, based on weight percent silica, less than about 100 wppm aluminum ions, preferably less than about 50 wppm and a hydrolyzable source of ammonia, e.g., urea. Aside from other differences with prior art crystalline silicate compositions, the silicate and borosilicate compositions formed herein are substantially free of aluminum with the molar ratio of $SiO_2/Al_2O_3$ being greater than about 8,000, and even 30,000.

It is not known why the crystalline compositions of this invention provide such unexpected properties as improved selectivity with DME and low hydrocarbon yield and high DME yield with methanol for the silicates and high $C_5+$ yield with ethylene and synthesis gas for the borosilicates. It is possible that the urea precipitation provides the metal hydroxide in a finely divided form not achieved in other metal containing reaction mixtures and that the metal is located in the crystalline structure in a manner not achieved in prior art silicates prepared by other methods so that the catalytic properties of the compositions of this invention are different from those of other metal silicates and borosilicates.

The crystalline metal silicates and borosilicates of the present invention are prepared by urea precipitation which causes a metal hydroxide to precipitate in finely divided form. When urea decomposes it releases ammonia which in water forms ammonium hydroxide. This causes the pH of the aqueous mixture to uniformly change. With a strong base such as caustic there is a highly localized and rapid increase in pH which with diffusion, convection and/or mixing gradually dissipates to a moderate pH increase. Urea does not function in this fashion, with urea the pH increase is gradual and uniform throughout the mixture.

Providing the metal hydroxide precipitate in finely divided form by the procedure identified herein as urea precipitate is critical to the process of this invention. As discussed aboe, strong bases do not provide the desired precipitation. Urea and other compounds which upon hydrolysis release ammonia are the materials which precipitate the metal hydroxides in the desired fashion in the invention. Thus, the useful area precipitation agents include such compounds as urea, acetamide, hydrolyzable derivatives thereof and the like.

The metal from which the compositions of this invention is any metal which is subject to urea precipitation, i.e., any metal whose salt is soluble and whose hydroxide will precipitate in a pH above 7. Most metals fall within this definition yet some, such as sodium and potassium, clearly do not. Useful metals herein include bismuth, cobalt, chromium, iron, molybdenum, nickel, ruthenium, tin, tungsten, palladium and platinum. One skilled in the art can, by routine procedures and without an undue amount of experimentation, screen a number of possible candidates by dissolving soluble metal salts in water and adding a source of hydroxide ions until the pH is above 7.

In preparing the crystalline compositions of the invention it is important that substantially aluminum-free raw materials be employed. The substantially aluminum free silica source can be any of those commonly considered for use in synthesizing zeolites such as powdered solid silica, silicic acid, colloidal silica or dissolved silica. A preferred silica source is Cab-O-Sil, sold by Cabot Co.

The substantially aluminum free alkali metal hydroxide is sodium hydroxide, potassium hydroxide or mixtures thereof. Sodium hydroxide is preferred.

The substantially aluminum-free tetraalkyl ammonium compound may be tetrapropyl ammonium hydroxide, chloride, bromide and the like.

Similarly, suitable metal salts which are substantially aluminum free and are soluble in the reaction mixture may be employed. Among the various metal salts which may be employed, those which are preferred include: Group IVA—tin Group VA—bismuth; Group VIB—chromium, molybdenum, tungsten; Group VIII—iron, cobalt, nickel, ruthenium, palladium, platinum. The chloride salt is often very useful.

In the optional embodiments, the substantially aluminum-free source of boron may be boron oxide, boric acid, sodium borate and the like.

Where a chelating agent forms part of the reaction mixture, ethylenediaminetetraacetic acid (EDTA), nitriliotriacetic acid (NTA), 8-hydroxyquinoline-5-sulfonic acid (8HQS) and the like may be employed.

The specific crystalline compositions described, when evaluated for catalytic properties without having been calcined, are inactive, possibly because the intracrystalline free space is occupied by organic cations from the forming solution. They may, however, be activated by heat treatment using known techniques such as heating in an inert atmosphere or air at 200°–900° C., for 1 to 60 hours. This may be followed by ion exchange with ammonium salts and further heat treatment at 200°–900° C. if desired.

The crystalline compositions can be used either in the alkali metal form, e.g., the sodium form, the ammonium form, the hydrogen form, or other univalent or multivalent cationic form. Preferably, either the ammonium or hydrogen form is employed. They can also be used in intimate combination with hydrogenating components such as tungsten, vanadium, copper, molybdenum, rhenium, iron, nickel, cobalt, chromium, manganese, or a noble metal such as platinum or palladium where a hydrogenationdehydrogenation function is to be performed. Such component can be exchanged into the composition, impregnated therein or physically intimately admixed therewith. Such component can be impregnated in or on to the present catalyst such as, for example, in the case of platinum, by treating the crystalline composition with a platinum metal-containing ion. Thus, suitable platinum compounds include chloroplatinic acid, platinous chloride and various compounds containing the platinum amine complexes.

The catalyst, when employed either as an adsorbent or as a catalyst in one of the aforementioned processes, may be heat treated as described hereinabove.

Members of the present family of crystalline compositions can have the original cations associated therewith replaced by a wide variety of other cations according to techniques well-known in the art. Typical replacing cations would include hydrogen, ammonium and metal cations including mixtures of the same. Of the replacing metallic cations, particular preference is given to cations of metals such as rare earth metals, manganese and calcium as well as metals of Group II of the Periodic Table, e.g., zinc and Group VIII of the Periodic Table, e.g., nickel. These replacing cations are included within the definition of R in the formula employed herein to describe the compositions of this invention.

Typical ion exchange techniques include contacting the members of the family of borosilicates with a salt solution of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249, 3,140,251 and 3,140,253, which are incorporated herein by reference.

Following contact with the salt solution of the desired replacing cation, the crystalline compositions are then preferably washed with water and dried at a temperature ranging from 65° C. to about 315° C. and thereafter heat treated as previously described.

Regardless of the cations replacing the sodium in the synthesized form of the catalyst, the spatial arrangement of the atoms which form the basic crystal lattices in any given composition of this invention remain essentially unchanged by the described replacement of sodium or other alkali metal as determined by taking an X-ray powder diffraction pattern of the ion-exchanged material. For example, the X-ray diffraction pattern of several ion-exchanged compositions reveal a pattern substantially the same as that of ZSM-5 zeolite.

When activated, these compositions exhibit catalytic properties distinct from comparable silicate and borosilicate compositions prepared from reaction mixtures which do not contain these same metal ions but which have been ion exchanged to place these same metal ions into the composition. For reasons yet unknown, the compositions of this invention containing the same metal ions, viz. a Group VIII metal ion, perform differently depending on whether the Group VIII metal ion was formed as part of the crystalline structure at its inception, i.e., by urea precipitation from the reaction mixture or was placed in the structure subsequent to its formation by such means as ion exchanges.

The compositions prepared by the instant invention are formed in a wide variety of particular sizes. Generally speaking, the particles can be in the form of a powder, a granule, or a molded product, such as extrudate having a particle size sufficient to pass through a 2 mesh (Tyler) screen and be retained on a 100 mesh (Tyler) screen. In cases where the catalyst is molded, such as by extrusion, the composition can be extruded before drying or dried or partially dried and then extruded.

In the case of many catalysts, it is desired to incorporate the composition of this invention with another material resistant to the temperatures and other conditions employed in organic conversion processes. Such materials include active and inactive materials and synthetic or naturally occurring crystalline compositions as well as inorganic materials such as clays, silica and/or metal oxides. The latter may be either naturally occurring or in the form of gelatinous precipitates or gels including mixtures of silica and metal oxides. Use of a material in conjunction with the present catalyst tends to improve the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc. function as binders for the catalyst. It is desirable to provide a catalyst having good crush strength, because in a chemical process the catalyst is often subjected to handling or use which tends to break the catalyst down into powder-like materials which cause problems in processing. These clay binders have been employed for the purpose of improving the crush strength of the catalyst.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel.

The following examples are presented as specific embodiments of the present invention and show some of the unique characteristics of the claimed crystalline compositions and are not to be considered as constituting a limitation on the present invention.

EXAMPLE I

This example demonstrates the preparation of several members of the novel crystalline silicates of the present invention including the following:

| | |
|---|---|
| Iron silicate | Catalyst I |
| Iron borosilicate | Catalyst II & III |
| Cobalt silicate | Catalyst IV |
| Cobalt borosilicate | Catalyst V |

Iron Silicate: Catalyst I

A sodium silicate solution (A) containing less than 100 ppm aluminum (based on silica) was prepared by dissolving 80 g of high purity silica (Cab-O-Sil) in a boiling solution, of 700 ml water and 55 g of a 50–52% aqueous NaOH solution. A second solution (B) containing 85 g NaCl, 33 g of tetrapropylammonium bromide (TPA-Br), 23 g of concentrated sulfuric acid, and 300 ml of water was prepared. With both solutions at room temperature, solution B was slowly added to the sodium silicate solution with stirring. The pH was then lowered from 9.04 to 8.50 by adding sulfuric acid.

A solution of 6.3 g $FeCl_3 \cdot 6H_2O$, 6.8 g urea, and 150 ml water was prepared at room temperature. No solids were present. The solution was heated to boiling and held at reflux for 20 hours. During heating, some of the urea decomposed evolving ammonia which caused iron to precipitate. The iron containing slurry was then added to the stirred silicate mixture.

The entire mixture was placed in a 2000 ml polypropylene flask which was partially immersed in a hot oil bath at 120° C. A reflux condensor was attached to the flask. After 22 days, the flask was removed from the oil bath and cooled. The solid was thoroughly washed with dionized water, collected on a filter and dried at 110° C., yielding 92.2 g of final product. The dried material was submitted for X-ray analysis and had the same pattern as that published for ZSM-5 type aluminosilicate (zeolite).

A portion (37.9 g) of the dried sample was calcined at 538° C. for 16 hours during which it lost 12.9% of its initial weight. The calcined sample was mixed with a solution of 60 g $NH_4Cl$ in 300 ml of water and refluxed for 4 hours. After washing, the exchange was repeated for 16 hours. The material was filtered, washed, and dried. Before testing, the ammonium ion form was converted to the H-ion form by heating in air at 538° C.

| Analysis | | |
|---|---|---|
| Before Ion Exchange | Fe = 1.29% | Al = 74 ppm |
| After Ion Exchange | Fe = 1.52% | Al = 77 ppm |

Iron Borosilicate: Catalysts II and III

Two crystalline iron borosilicate catalysts were prepared by the same general procedure as for catalyst I except that 8.9 g of boric acid was dissolved in solution B. Both catalysts exhibited the ZSM-5 type X-ray powder pattern. More information on each catalysts is presented below.

| Catalyst | II | III |
|---|---|---|
| Growth time (days) | 12 | 12 |
| Analysis | | |
| Before Ion Exchange | | |
| Fe | 1.2% | 1.31% |
| B | 0.38% | 0.54% |
| Al | 31 ppm | 26 ppm |
| After Ion Exchange | | |
| Fe | 1.4% | 1.30% |
| B | 0.28% | 0.28% |
| Al | 32 ppm | 52 ppm |

Cobalt Silicate and Cobalt Borosilicate: Catalysts IV and V

Two catalysts were prepared by the same method as catalysts I, II and III except that 8.5 g $Co(NO_3)_2.6H_2O$, 12.5 g urea and 175 ml water were used in place of the iron-urea solution. Further information on each catalyst is presented in the following table.

| Catalyst | IV | V |
|---|---|---|
| Boric Acid Added | No | Yes |
| Growth Time | 13 | 13 |
| Analysis | | |
| Before Ion Exchange | | |
| Co | 1.63% | 1.65% |
| Al | 19 ppm | 25 ppm |
| B | — | 0.44% |
| After Ion Exchange | | |
| Co | 1.28% | 0.83% |
| Al | 30 ppm | 35 ppm |
| B | — | 0.33% |

EXAMPLE II

The iron silicate and iron borosilicate of Example I (Catalysts I, II and III) were evaluated for their catalytic properties and compared to catalysts designated A, B and C which had been prepared by other methods.

Catalyst A was an iron silicate prepared without a chelating agent. The catalyst is similar to the catalyst disclosed in Example 6 of British Pat. No. 1,555,928 (German Offenlegungschrift No. 27 55 770).

Catalyst B was an iron silicate prepared with a chelating agent.

Catalyst C was an iron borosilicate prepared with a chelating agent and is the subject of commonly assigned and copending patent application Ser. No. 256,308 filed Apr. 22, 1981.

Catalyst C was prepared as follows:

80.0 g of fumed silica (Cab-O-Sil) was dissolved in 55.0 g of 50% NaOH and 800 ml water. The solution was poured into a 2000 ml polypropylene flask which was placed in an oil bath at 120° C. for 24 hours. A reflux condenser was attached to the flask.

A second solution was prepared containing 85.0 g NaCl, 33.0 g tetrapropylammonium bromide, 8.9 g boric acid, 19.0 g of concentrates sulfuric acid and 350 ml water.

With both solutions at room temperature, the second solution was slowly added to the sodium silicate solution with mixing.

A third solution containing 8.5 g of 50% NaOH, 13.0 g of 8 hydroxyquinoline-5-sulfonic acid (8HQS), 300 ml water and 6.0 g of $FeCl_3.6H_2O$ was prepared and added to the above.

The pH was 9.1 and was adjusted to 8.5 with $H_2SO_4$. Total weight of mixture = 1791.3 g.

The slurry was placed in a 2000 ml polypropylene flask (reflux condenser attached) and partially immersed in an oil bath at 120° C. for 15 days, after which the flask was removed and cooled. The pH = 10.1 and the weight loss due to evaporation was 25 g. The solid was collected on a filter, washed and dried at 120° C. for 24 hours yielding 86.6 g of the $Na^+$ form of the iron borosilicate.

Fe = 1.2%; B = 0.27%

Catalyst A was prepared as Catalyst C except no boron compound and no 8HQS were used.

Catalyst B was prepared as Catalyst C except no boron compound was used.

The iron silicate catalysts were evaluated as follows:

1. Dimethyl Ether (DME) Test Data

All catalysts were tested in the $H^+$ form with 1.5 g DME/g cat/hr at 6 psig.

| Catalyst Syn. Method | I Urea PPT. | | A "Prior Art Type" | | B 8 HQS | |
|---|---|---|---|---|---|---|
| Temp. °C. | 420 | 500 | 420 | 500 | 420 | 500 |
| % HC Yield (C) | 89 | 82 | 99 | 99 | 100 | 100 |
| % HC Sel. (C) | | | | | | |
| $C_1$ | 5 | 4 | 3 | 5 | 7 | 7 |
| $C_2$ | 1 | 4 | 3 | 8 | 0 | 6 |
| $C_3$ | 20 | 14 | 17 | 16 | 8 | 5 |
| $C_4$ | 18 | 13 | 22 | 19 | 24 | 26 |
| $C_{5+}$ | 50 | 55 | 40 | 14 | 54 | 28 |
| Ar | 5 | 9 | 15 | 38 | 7 | 28 |

The test data shows the urea precipitation method yields a catalyst that is superior to catalysts prepared by other methods for the production of aliphatic hydrocarbons. The differences in hydrocarbon selectivity are maximized at 500° C.

2. Ethylene Test Data

Not available.

3. Methanol Test Data

The catalysts were tested in the $H^+$ form with 1.5 g $C_2H_4$/g cat/hr and a $N_2$ cofeed (molar $CH_3OH/N_2 \sim 1$) at 6 psig.

| Catalyst Syn. Method | I Urea PPT. | | A "Prior Art Type" | | B 8 HQS | |
|---|---|---|---|---|---|---|
| Temp. °C. | 420 | 500 | 420 | 500 | 420 | 500 |
| % HC Yield (C) | 15 | 2 | 98 | 99 | 92 | 98 |
| % HC Sel. (C) | | | | | | |
| $C_1$ | 0 | 100 | 1 | 7 | 1 | 9 |
| $C_2$ | 0 | 0 | 3 | 8 | 3 | 9 |
| $C_3$ | 12 | 0 | 0 | 5 | 4 | 14 |
| $C_4$ | 45 | 0 | 4 | 42 | 51 | 17 |
| $C_{5+}$ | 43 | 0 | 88 | 16 | 39 | 23 |
| Ar. | 0 | 0 | 3 | 22 | 2 | 29 |
| % Oxy Yield (C) | 36 | 51 | 0 | 1 | 0 | 1 |
| % Oxy Sel. (C) | | | | | | |
| $CO/CO_2$ | 0 | 3 | — | 100 | — | 100 |
| DME | 100 | 97 | — | 0 | — | 0 |

Test data shows the product selectivities obtained from Catalyst I are quite different than those obtained with catalyst A and B. Compared to A and B, catalyst I gives high yields of DME and relatively low hydrocarbon yields.

4. Synthesis Gas Test Data

Not available.

The iron borosilicates were evaluated as follows. Comparative data for iron borosilicates prepared without chelate have not been included since the compositions are usually amorphorous.

1. DME Test Data

Catalysts were tested in the H+ form with 1.5 g DME/g cat/hr. at 6 psig.

| Catalyst | II | | III | | C | |
|---|---|---|---|---|---|---|
| Syn. Method | Urea PPT. | | Urea PPT. | | 8 HQS | |
| Temp. °C. | 420 | 500 | 420 | 500 | 420 | 500 |
| % HC Yield (C) | 100 | 100 | 100 | 100 | 100 | 99 |
| % HC Sel.(C) | | | | | | |
| $C_1$ | 3 | 3 | 4 | 8 | 5 | 9 |
| $C_2$ | 1 | 3 | 0 | 5 | 0 | 6 |
| $C_3$ | 23 | 11 | 20 | 16 | 8 | 10 |
| $C_4$ | 18 | 40 | 25 | 24 | 24 | 25 |
| $C_{5+}$ | 53 | 38 | 48 | 36 | 54 | 38 |
| Ar | 2 | 5 | 3 | 12 | 9 | 12 |

Catalysts II and III show the reproducibility of synthesis and testing. The hydrocarbon selectivities of these catalysts are very similar to those obtained with C.

2. Ethylene Test Data

Catalysts were tested in the H+ form with 1.5 g $C_2H_4$/g cat/hr. at 420° C. and 6 psig.

| Catalyst | II | III | C |
|---|---|---|---|
| Syn. Method | Urea PPT. | Urea PPT. | 8 HQS |
| % HC Yield (C) | 0 | 7 | 9 |
| % HC Sel. (C) | | | |
| $C_1$ | — | 0 | 0 |
| $C_2H_6$ | — | 0 | 14 |
| $C_3$ | — | 2 | 0 |
| $C_4$ | — | 34 | 86 |
| $C_{5+}$ | — | 64 | 0 |
| Ar | — | 0 | 0 |

A difference in catalytic properties is observed depending on the method of preparation. Catalyst III gave predominantly $C_{5+}$ hydrocarbons, while C gave mostly $C_4$ hydrocarbons.

3. Methanol Test Data

Both catalysts were tested in the H+ form with 1.5 g $CH_3OH$/g cat/hr and a $N_2$ cofeed (molar $CH_3OH/N_2 \sim 1$) at 6 psig.

| Catalyst | III | | C | |
|---|---|---|---|---|
| Syn. Method | Urea PPT. | | 8 HQS | |
| Temp. °C. | 420 | 500 | 420 | 500 |
| % HC Yield (C) | 86 | 94 | 94 | 88 |
| % HC Sel. (C) | | | | |
| $C_1$ | 1 | 3 | 1 | 10 |
| $C_2$ | 1 | 3 | 2 | 11 |
| $C_3$ | 0 | 0 | 6 | 22 |
| $C_4$ | 15 | 4 | 29 | 25 |
| $C_{5+}$ | 82 | 89 | 60 | 12 |
| Ar | 1 | 2 | 3 | 19 |

The hydrocarbon selectivities above show that catalyst III gave an exceptionally high $C_{5+}$ fraction, particularly at 500° C., relative to catalyst C.

4. Synthesis Gas Test Data

Not available.

EXAMPLE III

The cobalt silicate and cobalt borosilicate of Example I (Catalysts IV and V) were evaluated for their catalytic properties in a series of tests. The results are as follows:

1. DME Test Data

Both catalysts were tested in the H+ form with 1.5 g DME/g cat/hr at 6 psig.

| Catalyst Composition | IV $SiO_2/Co_2O_3$ | V $SiO_2/B_2O_3/Co_2O_3$ | |
|---|---|---|---|
| Temp. °C. | 420 | 420 | 500 |
| % HC Yield (C) | 4 | 6 | 12 |
| % HC Sel. (C) | | | |
| $C_1$ | 52 | 44 | 30 |
| $C_2$ | 0 | 4 | 5 |
| $C_3$ | 42 | 30 | 20 |
| $C_4$ | 3 | 14 | 30 |
| $C_{5+}$ | 3 | 8 | 15 |
| Ar | 0 | 0 | 0 |

2. Ethylene Test Data

Both IV and V were inactive at 420° C.

3. Methanol Test Data

Not available.

4. Synthesis Gas Test Data

Not available.

What is claimed is:

1. A method of preparing a crystalline silicate composition which comprises:
   (a) preparing a first mixture comprising a tetraalkyl ammonium salt, alkali metal hydroxide, silica and water,
   (b) preparing a second mixture comprising water, a soluble source of a metal whose hydroxide precipitates at a pH above 7 and an amount of urea or a compound which upon hydrolysis releases ammonia, said amount effective to precipitate the hydroxide of said metal,
   (c) admixing an amount of said first mixture and an amount of said second mixture effective to provide a reaction mixture having an aluminum content of less than about 100 wppm (based on silica) and having a composition in terms of mole ratios of oxides, falling within the following ranges:

| | |
|---|---|
| $OH^-/SiO_2$ | 0.05–3 |
| $Q^+/(Q^+ + A^+)$ | 0.01–1 |
| $H_2O/OH^-$ | 10–800 |
| $SiO_2/M_{2/m}O$ | 10–10,000 | wherein $Q^+$ is tetralkyl ammonium ion, $A^+$ is alkali metal ion, M is said metal and m is the valence of said metal, whereby the hydroxide of said metal forms a precipitate, (d) maintaining the reaction mixture at a temperature of about 50° to about 250° C. until crystals of metal silicate are formed and (e) separating and recovering said crystals.

2. A method according to claim 1 wherein a soluble boron compound is admixed with said first mixture and wherein the mole ratios of oxides in said reaction mixture has an additional mole ratio range of
$SiO_2/B_2O_3$: 2–1000.

3. A method according to claim 1 wherein the metal is iron, cobalt, bismuth, chromium, molybdenum, nickel, tin, platinum or mixtures thereof.

4. A method according to claim 1 wherein the first mixture of step (a) additionally comprises sulfuric acid and sodium chloride and step (d) is conducted under refluxing conditions.

5. A method of preparing a crystalline silicate composition which comprises:
  (a) preparing a first mixture comprising a tetraalkyl ammonium salt, alkali metal hydroxide, silica and water,
  (b) preparing a second mixture comprising water, a soluble source of a metal whose hydroxide precipitates at a pH above 7 and an amount of urea or a compound which upon hydrolysis releases ammonia, said amount effective to precipitate the hydroxide of said metal,
  (c) maintaining said second mixture under conditions effective to cause the hydroxide of the metal to precipitate,
  (d) admixing an amount of said first mixture and an amount of said second mixture effective to provide a reaction mixture having an aluminum content of less than about 100 wppm (based on silica) and having a composition in terms of mole ratios of oxides, falling within the following ranges:

| | |
|---|---|
| $OH^-/SiO_2$ | 0.05–3 |
| $Q^+/(Q^+ + A^+)$ | 0.01–1 |
| $H_2O/OH^-$ | 10–800 |
| $SiO_2/M_{2/m}O$ | 10–10,000 | wherein $Q^+$ is tetralkyl ammonium ion, $A^+$ is alkali metal ion, M is said metal and m is the valence of said metal,
  (e) maintaining the reaction mixture at a temperature of about 50° to about 250° C. until crystals of metal silicate are formed and
  (f) separating and recovering said crystals.

6. A method according to claim 5 wherein a soluble boron compound is admixed with said first mixture and wherein the mole ratios of oxides in said reaction mixture has an additional mole ratio range of
$SiO_2/B_2O_3$: 2–1000.

7. A method according to claim 6 wherein the metal is iron, cobalt, bismuth, chromium, molybdenum, nickel, tin platinum or mixtures thereof.

8. A method according to claim 5 wherein the first mixture of step (a) additionally comprises sulfuric acid and sodium chloride and step (c) and (e) are conducted under refluxing conditions.

9. A method according to claim 5 wherein the metal is iron.

10. A method according to claim 9 further containing a boron compound in the first mixture.

* * * * *